Aug. 28, 1962   B. BERGMAN ET AL   3,051,280
OUTWARD-OPENING PLUG TYPE DOOR FOR AIRCRAFT
Filed April 4, 1958   6 Sheets-Sheet 2
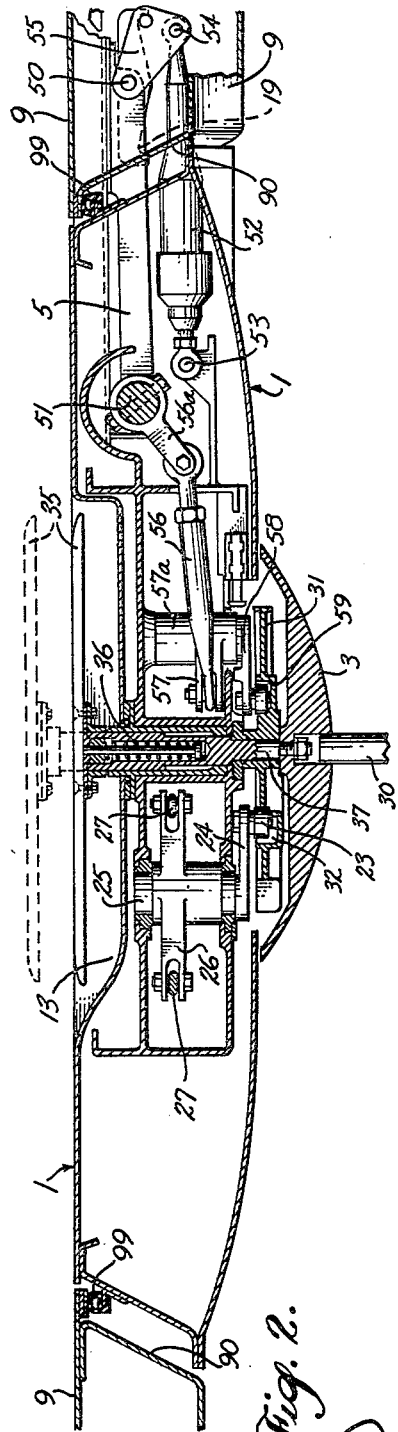
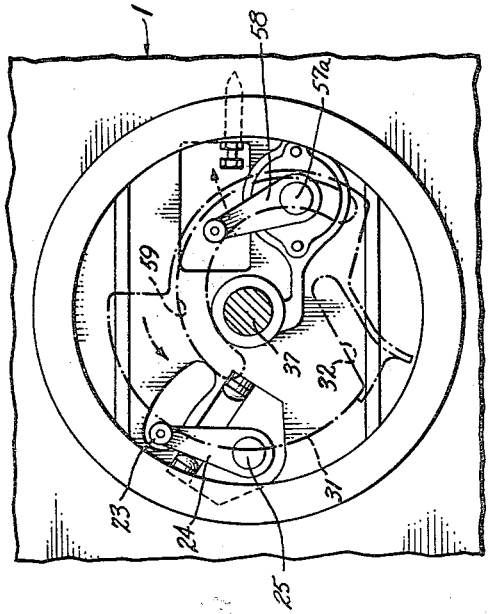
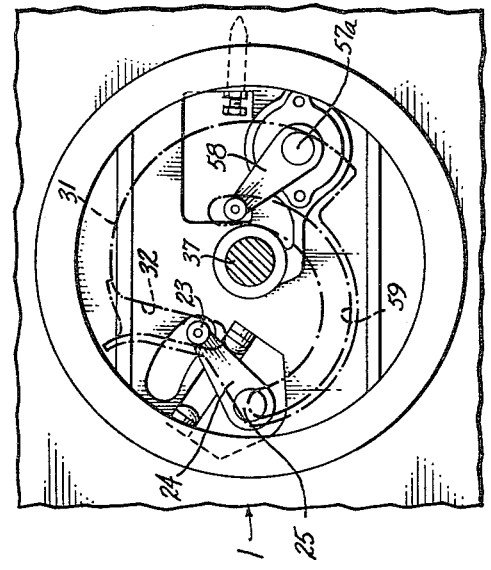
INVENTORS.
BURTON BERGMAN, ROBERT D. EISENHART,
ALLAN W. OPSAHL, STUART K. WOOD
BY
Reynolds, Beach & Christensen
ATTORNEYS

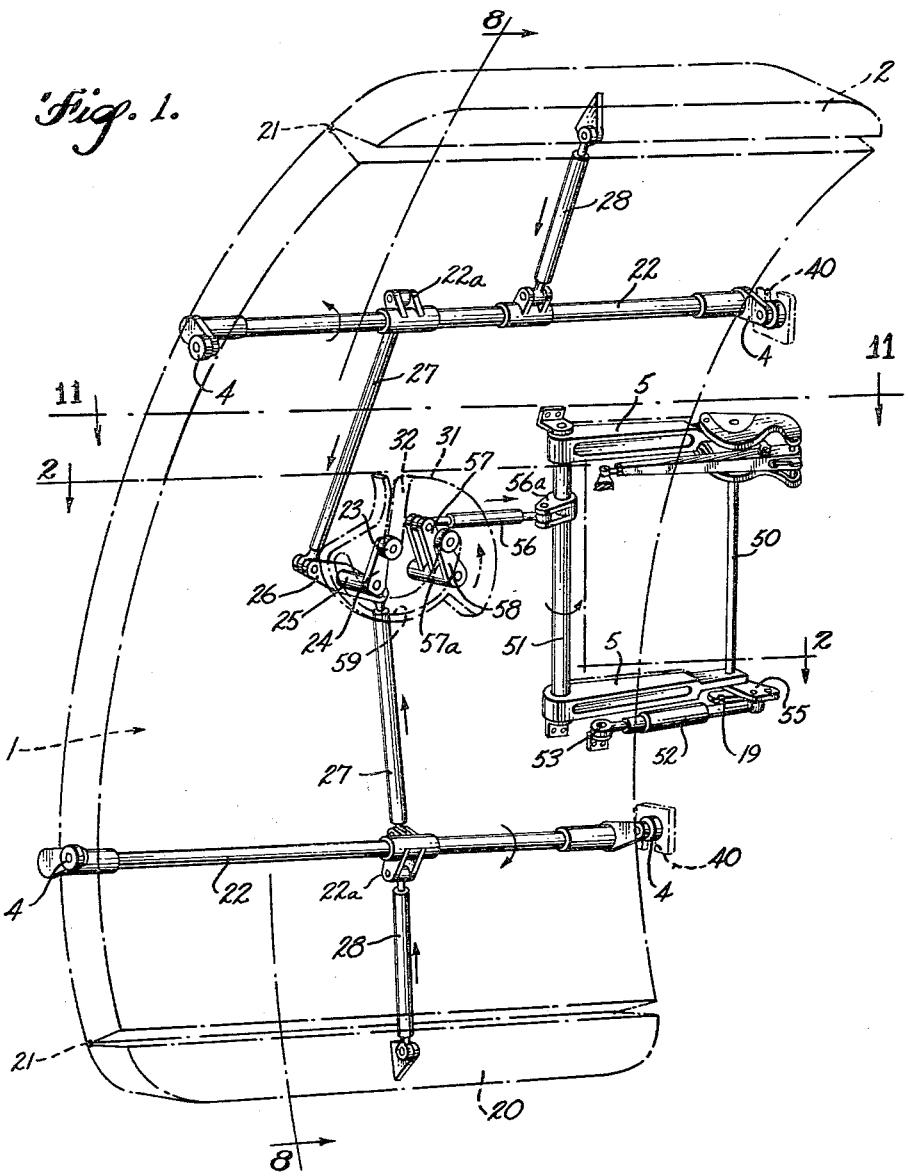

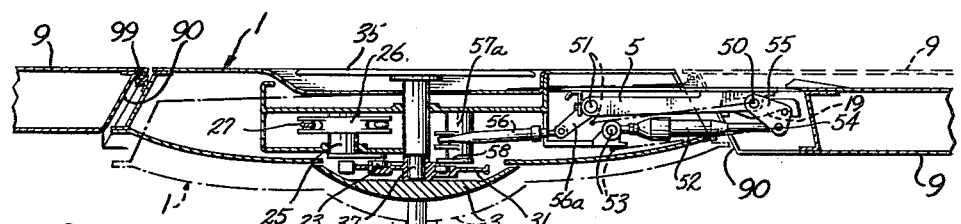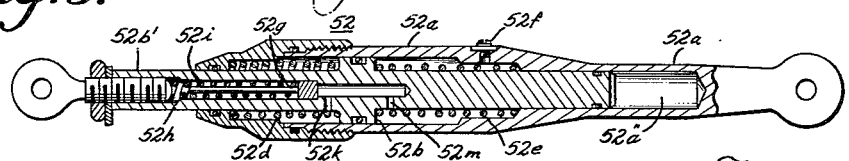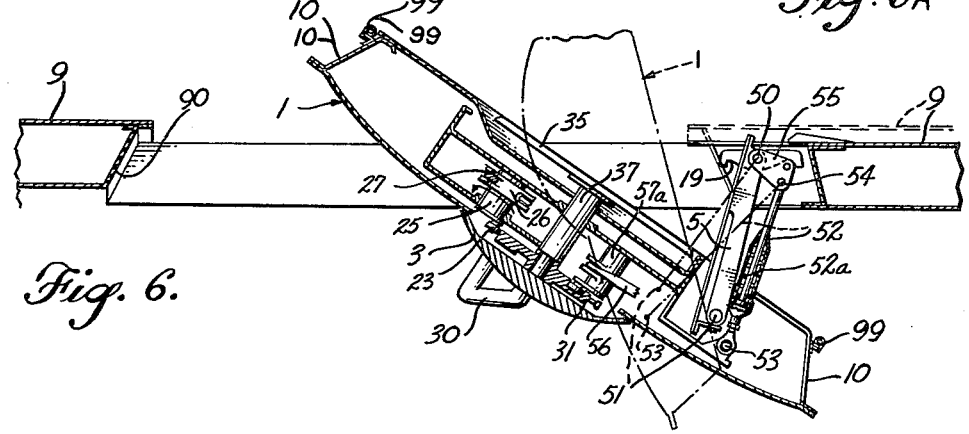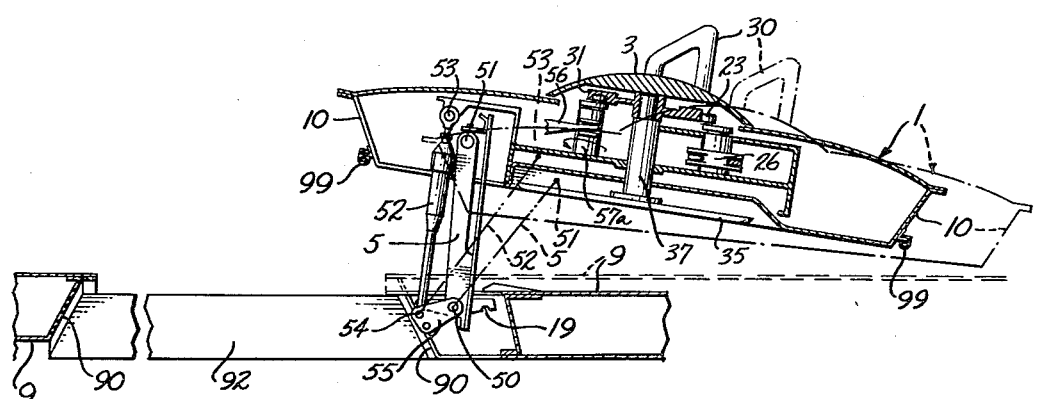

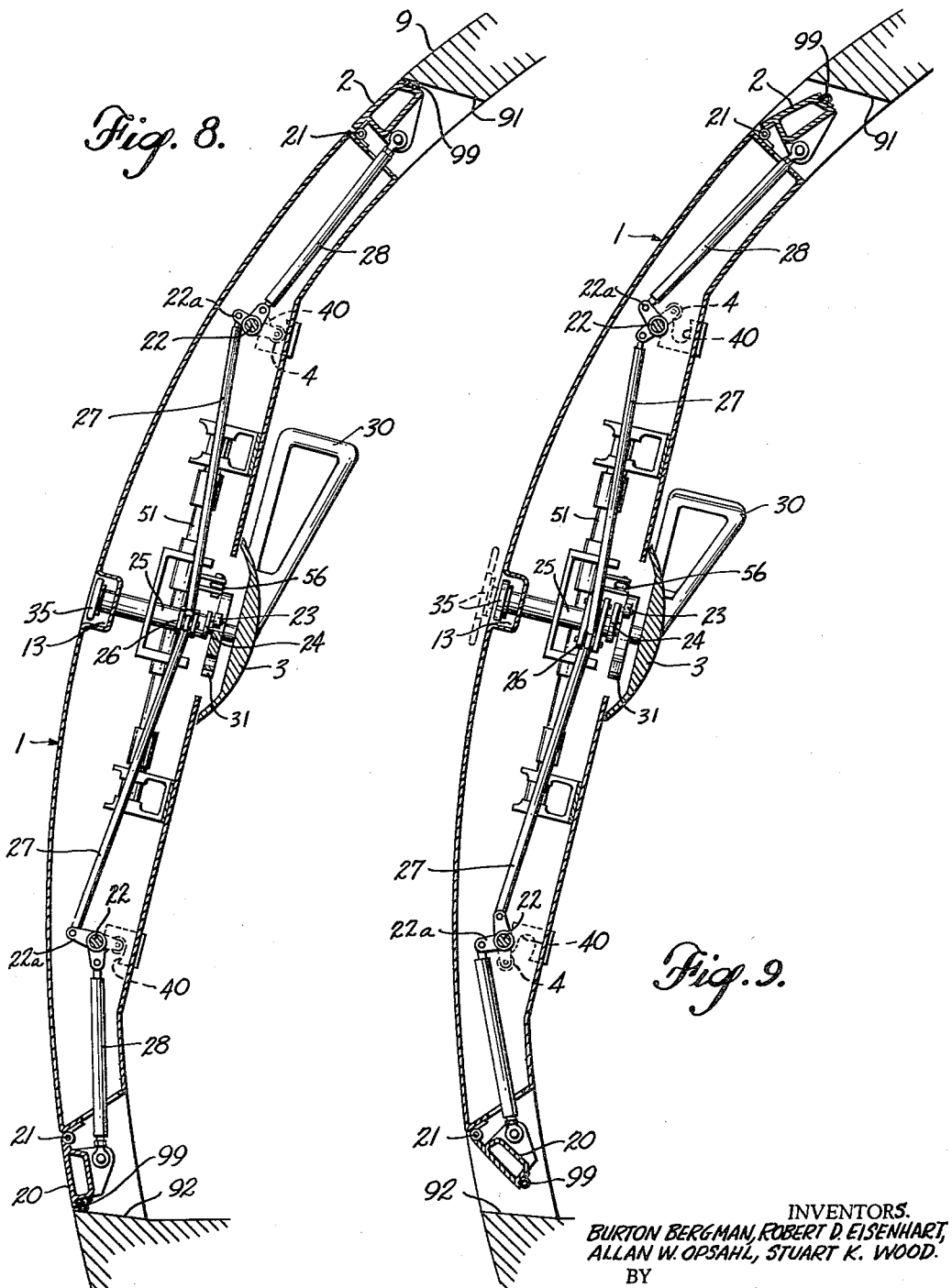

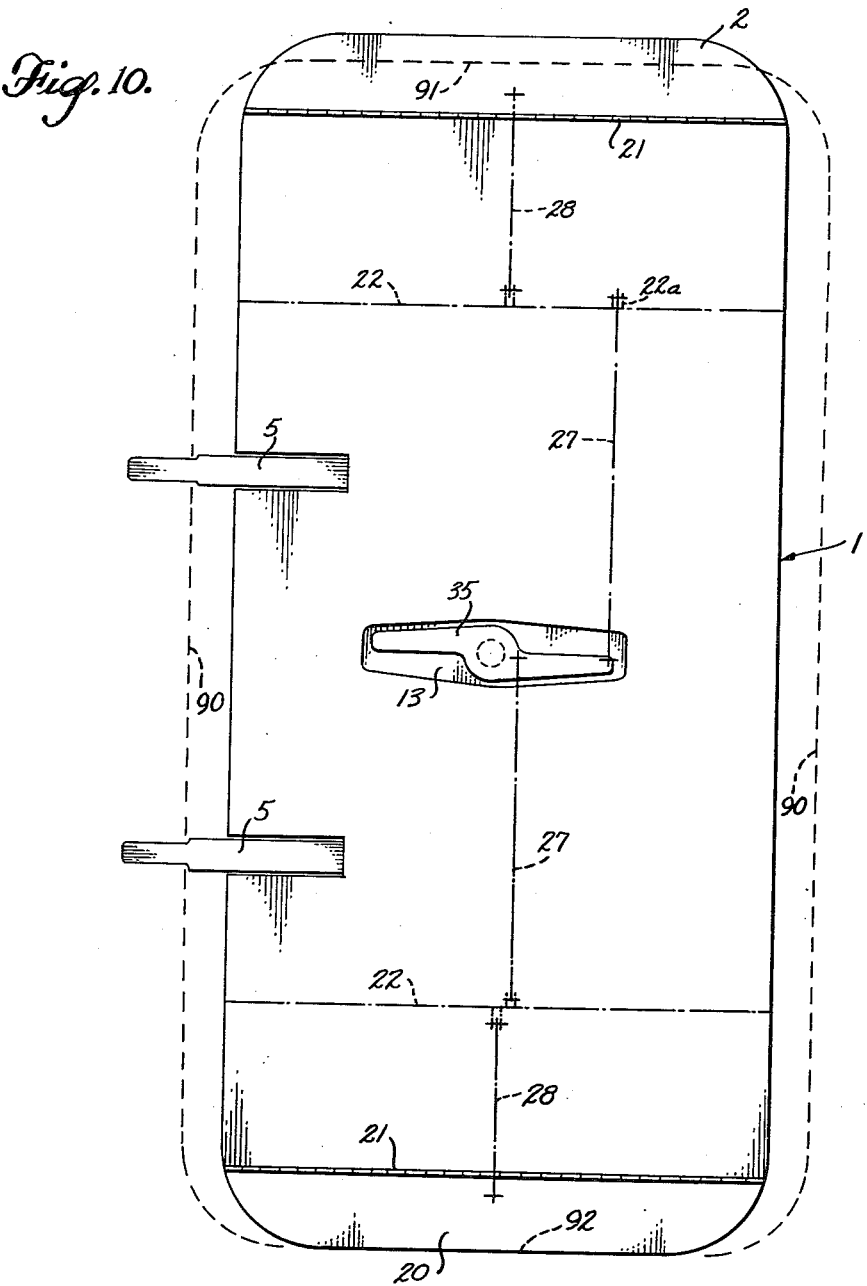

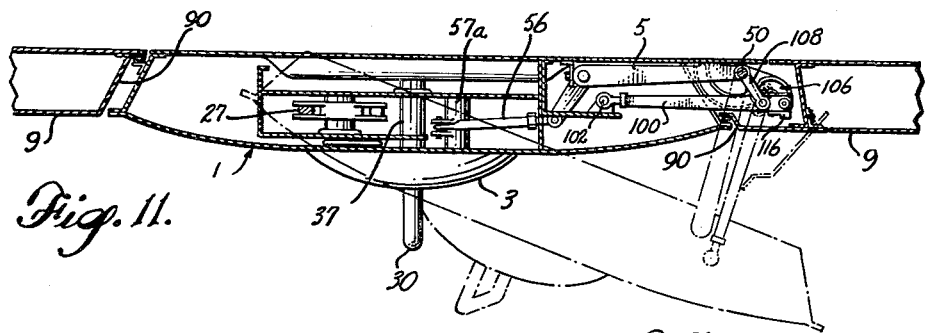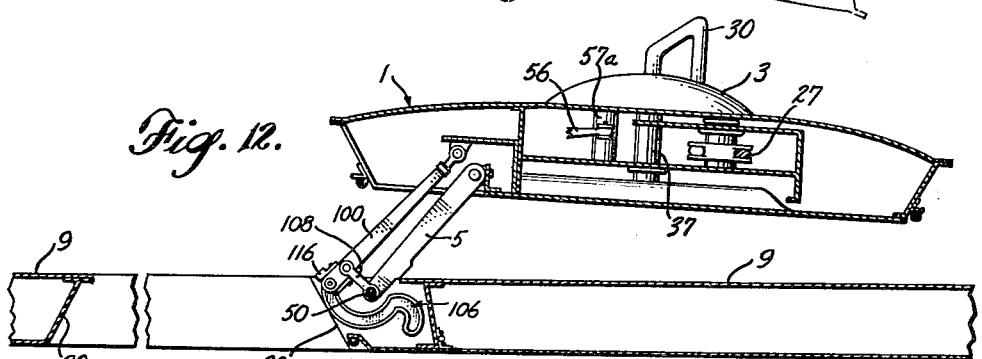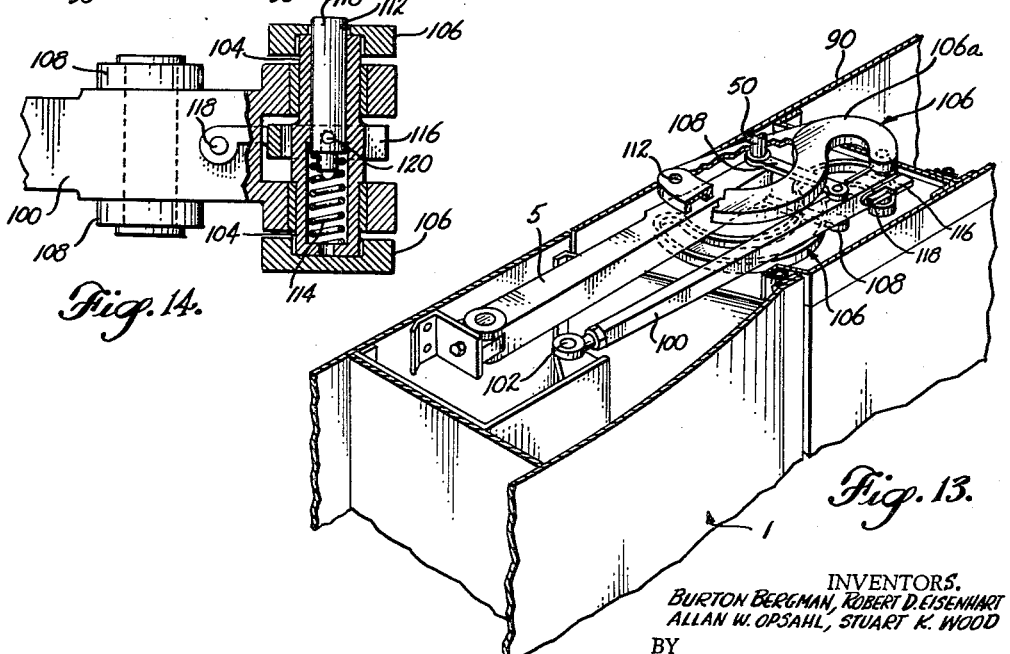

United States Patent Office 3,051,280
Patented Aug. 28, 1962

3,051,280
OUTWARD-OPENING PLUG TYPE DOOR
FOR AIRCRAFT
Burton Bergman, Kent, and Robert D. Eisenhart, Allan W. Opsahl, and Stuart K. Wood, Seattle, Wash., assignors to Boeing Airplane Company, Seattle, Wash., a corporation of Delaware
Filed Apr. 4, 1958, Ser. No. 726,573
7 Claims. (Cl. 189—46)

There have been various proposals for insuring against the blowing out of a passenger exit door from pressurized aircraft cabins. A plug type door, larger in certain dimensions than the doorway, and moving to its final seat upon the doorway from the interior of the cabin, so that the internal pressure urges it to its seat, is most generally favored, and an example of such a door is found in the patent to Milton Heinemann and V. L. R. James No. 2,751,636, dated June 26, 1956. The present application contains claimed subject matter disclosed but not claimed in the application of Bergman and Wood, Serial No. 640,377, filed February 15, 1957, now abandoned.

The cabin interior has but limited space, and the door is curved in correspondence to the curvature of the cabin structure, hence if the door were simply hinged inwardly, it would occupy more space when open than is available. For that reason such doors are arranged and mounted so that when fully open they lie exteriorly of the aircraft structure alongside one side of the doorway. The necessity, however, for closing from the interior outwardly, yet of moving outwardly through the doorway for opening, introduces the problem of satisfactorily getting the door through a doorway which is narrower in some dimension, usually transversely, than the door itself, and yet of insuring the proper sealing all around of the door when the latter is closed, and the bolting of the same to secure it in its closed position.

In the above-cited patent application a door installation is disclosed featuring retractable tabs mounted at the door's upper and lower edges and which with the door closed seal the gap between those edges and the sill and lintel. An actuator is provided to retract these tabs for shortening the door so that it may pass outwardly through the doorway. The actuator movement also releases bolt mechanism bolting the door closed. Further movement of the same actuator applies torque to the door supporting and guiding means in a direction to unseat the door and swing it to a cocked position, addressing one edge outwardly through the doorway. Thereafter the door may be advanced manually through the doorway to an open position offset clear of the opening. The present invention concerns certain refinements and improvements in such a door installation.

In particular the present invention is directed to means for controlling and snubbing the motion of such an inside seating, outwardly opening, plug type door as it is advanced through the doorway and as it approaches its extreme positions. Such control is desirable or necessary where inexperienced hands may be attempting to operate it or where strong winds catch it and tend to force it out of the operator's grasp. Also the invention concerns a novel actuating means for operating the tabs and initiating the cocking movement, and combinations of such actuating means and the motion controlling and snubbing means.

It is a further object of the present invention to accomplish the ends indicated above by simple, rugged, and reliable mechanism which can be depended upon to operate satisfactorily with a minimum of attention throughout the life of the aircraft. With such objects in mind, and others as will appear more fully hereinafter, the invention comprises the novel door and associated mechanism of the type indicated above, as shown in a typical example in the accompanying drawings, and as will be more fully explained hereinafter, and the principles whereof constituting this invention are set forth in the appended claims.

FIGURE 1 is an isometric shadow view of the door, illustrating the operating mechanism in full lines, and with parts in the closed and locked position.

FIGURE 2 is, in general, a transverse sectional view through the door substantially at the line indicated at 2—2 in FIGURE 1.

FIGURE 3 is an elevational view of the mechanism associated with the actuator, the latter being shown in dot-dash lines, with parts in a position nearly closed, and FIGURE 4 is a similar view, but showing parts approaching the open position.

FIGURE 5 is a view to a smaller scale, similar to FIGURE 2, but showing the door in its closed position and in its initial opening position.

FIGURE 6 is a view similar to FIGURE 5 showing the door in full lines in its fully cocked position, and in dot-dash lines in its bodily swung position, moving toward its fully opened position.

FIGURE 6A is an enlarged sectional detail view of a snubber link retarding motion of the door as it approaches either limit position.

FIGURE 7 is a view similar to FIGURES 5 and 6, but showing the door now approaching and actually in its fully open or stowed position.

FIGURE 8 is a vertical sectional view substantially as indicated by the line 8—8 in FIGURE 1, showing parts in the closed and locked position, and FIGURE 9 is a similar view, but showing parts in the first stages of the opening movement.

FIGURE 10 is an exterior view of the door and doorway.

FIGURE 11 is a transverse sectional view of the door and associated linkage and cam means for controlling its movements, the view being taken on line 11—11 in FIGURE 1.

FIGURE 12 is a similar view showing the parts in the door-open position.

FIGURE 13 is an enlarged sectional view, in perspective, showing details of the control mechanism.

FIGURE 14 is a fragmentary detail of the control cam, cam follower and associated door-open latch means.

In the different views similar or identical parts are identified by the same reference numerals.

Details of the aircraft structure have been largely omitted. This aircraft structure in the vicinity of the doorway is indicated by the numeral 9, and the doorway is defined by two spaced jambs 90, which are preferably inclined so that the doorway is of greater width at its interior than at its exterior skin, and by a lintel 91 and a sill 92. As shown, the lintel and sill preferably converge outwardly at a small angle in relation to one another, for a purpose to be described.

The door 1 is of a height less than the spacing between the lintel 91 and sill 92, but is of a width, at least at its inner surface, exceeding the smallest width of the doorway. Thus, the upright edges 10 of the door effectively converge outwardly in relation to one another, and are adapted to seat from the interior upon the spaced jambs 90 so that when closed the door plugs the opening and cannot be blown outwardly. The door, it will be understood, is curved as viewed edgewise, to conform to the exterior curvature of the aircraft cabin structure.

The door is supported and guided along one edge for movement with respect to the doorway, but before describing the door mounting and guiding means, it is desired to call attention first to the tab means and to the means for actuating these tabs, and for actuating certain bolt mechanism which locks the door in its closed position.

The tab means are shown in the present example along both the upper and lower horizontal edges of the door, but it will be understood that tab means might be located only along a single edge of the door and, indeed, such tab means are not necessarily mounted upon the door, but might be mounted upon the aircraft structure for movement into sealing relation with the door's edge or edges. Sealing means are suggested at 99, both upon the door and upon the tabs. In the drawings, then, an upper tab 2 and a lower tab 20 are shown, these being hingedly mounted at 21 along the corresponding edges of the door 1, so that the tabs may swing between the closed position illustrated in FIGURE 8, and the open position illustrated in FIGURE 9. In the open position of the tabs, they swing inwardly toward the interior of the cabin, with respect to the door, to decrease the combined overall height of the door. Originally, their combined height was equal to or may slightly exceed the height of the doorway. When the tabs are swung inwardly, that combined height is less than the height of the doorway. With the height thus decreased, it is evident that the door will readily pass edgewise through the doorway, in similar fashion to the movement of the door in the Heinemann and James patent referred to above. Conversely, when the tabs are swung outwardly, they tend to wedge within the doorway, effectively overlapping the inside of the outwardly convergent sill and lintel edges of the doorway, and interior pressure urges them the more tightly into place.

Movement of the tab means is accomplished by means of an actuator 3, including a handle 30 fast upon a shaft 37, which normally would be mounted upon the door for rotative movement. Details of this mechanism are shown in FIGURES 2 to 4, inclusive. The actuator includes also a cam disk 31 fast upon the same actuator shaft, and having a cam slot 32 directed at a steep angle with respect to a radius, within which is engaged a cam follower 23 upon a crank arm 24 rockable about a pivot axis at 25 to swing a double-ended crank arm 26. Rock shafts 22 are mounted upon the door above and below the actuator, and links 27 connect the lever 26 with similar levers 22a upon the rock shafts 22, and motion is transmitted from the rock shaft 22 to the tab means 2 or 20 by further linkage 28. Preferably, in addition, crank arms 4 at the ends of the rock shafts 22 constitute locking bolts which, through the rocking of the rock shafts 22, are engaged with or disengaged from slotted or notched retainers 40 fixed at the sides of the doorway structure (see FIGURES 1, 8 and 9).

Rotation of the actuator 3 and its cam disk 31 from the position in which parts are shown in FIGURE 1, counterclockwise as viewed in FIGURE 1, rotates the crank 24 and, hence, causes movement of the two tabs 2 and 20 inwardly through the linkage mechanism from their wedged, closed position, and at the same time effects swinging of the lock bolt mechanism 4 out of engagement with the retainers 40. This has the effect of releasing the door for movement, and at the same time of effecting communication between the cabin interior and the exterior atmosphere for equalization of pressure. Following this release of the door, it is ready to begin its opening movement. Before describing this opening movement, however, it will be necessary to describe the door mounting and guiding means.

Referring to FIGURES 1 through 10, the door is not directly hinged in the ordinary manner to one jamb of the doorway, but is connected by what might be described as two parallel linkage mechanisms, each consisting of an elongated hinge arm or link 5 of fixed length, pivoted at one end at 50 to the doorway structure and fixed to a torque shaft 51 pivotally mounted in an upright position upon the door adjacent one edge thereof. The linkage mechanism includes also a snubber link 52 of variable length which is generally parallel to a fixed link 5, but is spaced laterally from the same, one of its ends being pivotally connected at 53 to the door, and its opposite end at 54 to a short link 55 which is generally parallel to the link (a portion of the door proper) connecting the pivots 51 and 53. The short link 55 is pivotally mounted on the pivot 50.

Preferred details of construction of the snubber link 52 appear in FIGURE 6A. The chief purpose of this link is to avoid impact damage to the door and adjacent members. This it accomplishes by retarding motion of the door as it approaches its closed position (FIGURE 5) and also as it approaches its open position (FIGURE 7), without impeding its motion through the intermediate range. The snubber link includes a cylinder 52a and coacting piston 52b. An extension 52a' from one end of the cylinder is adapted for connection to pivot 54, whereas a piston rod 52b' extending through the opposite end of the cylinder is adapted for connection to the pivot 53. This rod extends through the cylinder into a guide bore 52a" for stiffening the snubber against bending. Springs 52d and 52e react between opposite ends of the cylinder and the respectively adjacent ends of the piston and thereby tend to center the piston within the cylinder so that the snubber when relieved of external forces of contraction or expansion will assume a length enabling it to yield either in tension or compression, as herein desired. Damping liquid is introduced into the cylinder through a filler plug 52f. A hollow bore within the externally projecting portion of piston rod 52b' is occupied by a piston 52 g, a stop rod 52h which limits piston displacement in the bore, and a return spring 52i opposing such displacement. Communication into the piston rod bore from the cylinder interior at opposite ends of main piston 52b is afforded through ports 52k and 52m. Fluid expansion and contraction due to temperature change is thus permitted by displacement of piston 52d. Some cushioning of the shock of sudden impact forces of tension and compression imposed on the snubber link is also achieved by the deflectability of piston 52g through a limited range against the force of spring 52i, resulting from the rise of pressure in the end of the piston rod bore opposite that occupied by spring 52i when the snubber is suddenly required to lengthen or shorten.

The torque shaft 51 carries a crank arm 56a fixed thereon so that the crank arm 56a and the link 5 constitute in effect a bell crank lever. The crank arm 56a is connected by a link 56 to an arm 57 pivoted at 57a within the door structure, and a crank arm 58 upon the shaft 57a, and the end of which is a cam follower within the cam groove 59 of the cam disk 31, all cooperate to effect positive swinging movement of the door with respect to the torque shaft 51 and the pivot at 50 upon the doorway. In the closed position of the parts shown in FIGURE 1 the crank arm 58 is in its farthest left position, but shortly following initiation of rotation of the actuator, including the cam disk 31, and immediately following release of the bolt mechanism and inward swinging of the tab means, the cam slot 59 causes the crank arm 58 to swing to the right as viewed in FIGURE 1, rotating the torque shaft 51 in the direction shown by the arrow. The effect of this is shown in FIGURE 5. The door is unseated by a bodily inward or unplugging movement and the free edge of the door swings slightly clear of the doorway and inwardly into the cabin. As it is unseated by the actuator it swings on hinge arms 5 about pivots 50, and because short link 55 remains in its most counterclockwise position and because the snubber link 52 does not immediately change length, the pivot 53 is constrained to an arcuate path which is so related to the path of pivot 51 as to effect some swinging of the free edge of the door outwardly through the doorway. Such swinging and inward movement of the door initiated by operation of the actuator from its "closed" to its "open" position continues or is continued until the door reaches the fully cocked position shown in full lines in FIGURE 6. Thereupon the door may be swung bodily outwardly in an edgewise manner about pivot 50, passing through the dot-dash position of FIGURE 6 to the full line position of FIGURE 7. In so doing, the short link 5 swings from its position of FIGURE 6 to its position of FIGURE 7 and stop means 19 and associated stop pins 54a and 54, respectively, stop it in each of its two limit positions. In the position of FIGURE 7, some further movement of the now completely opened door is possible, until it reaches the stowed position shown in dot-dash lines in FIGURE 7, in which it may be held by latch means (not shown). As will be seen from FIGURE 7 the snubber link 52 cushions final movement of the door as it approaches the fully open position, the pin 54 contacting a notch in the end of stop 19 and requiring the snubber link to shorten in order to permit final opening movement of the door.

Closure of the door is effected by reverse movement of the parts, the final closing movement urging the door from the dot-dash line position of FIGURE 5 to the full line position of that figure, being preferably completed by movement of the actuator 3 from its "open" position to its "closed" position. Such actuator movement also moves the bolt mechanism 4 into locked position and swings the tab means 2 and 20 into their gaps-filling positions as in FIGURE 8, where their edges seal against the lintel and sill of the doorway. Means (not shown) are provided to seal between the links 5 and the notches in the door through which they swing, as in FIGURES 6 and 7.

It is usually desirable to permit the closure and the opening of such a door from the exterior by the ground crew. To this end a handle 35 is provided, retracted normally within a recess 13 of the door, but movable outwardly in opposition to a light spring 36, and keyed to the shaft 37 upon which is fixed the actuator 3. Thus, by drawing the handle 35 outwardly to the dash line position of FIGURE 2, it is possible to rotate the operation mechanism within the door from the exterior, and so to effect opening of the door, and conversely its closing, in the manner already indicated.

Referring to FIGURES 11 to 14, inclusive, means are shown for the positive guidance or control of the door's motion at every stage between open and closed positions, also for the latching of the door in open position. The control means comprises a link 100 of fixed length generally occupying the relative position of the snubber link 52, but with relation to the other hinge arm 5. One end of link 100 is pivotally connected to the door 1 by a means 102 laterally offset from the upper hinge arm 5. The link's opposite end carries a vertically disposed slide pin opposite ends of which are received slidably in the channels of elongated parallel guide tracks 106 of specially curved form, mounted on the wall structure adjacent the hinge pin 50. A control link in the form of a double link 108, pivoted at one end on hinge pin 50, is pivotally connected at its opposite end to the link 100 at a location, intermediate its ends, making the fourth link of a parallelogram linkage also including links 5 and 100 and the connecting portion of door structure. As the door swings in relation to the hinge arm 5 the parallelogram linkage angles must change. However, since the projecting, slider end of link 100 must follow curvilinear track 106, the latter, in any given position of link 100 necessarily controls the angular relationship of the door to the hinge arms 5.

The curved track 106 has an initial or inner portion 106a one end of which is normally occupied by the slider pin 104 (FIGURES 11 and 13). This it does with the door closed. From this end the track portion extends somewhat away from the door and curves in an arc outwardly and then generally along the wall toward the door and then inwardly and toward the door. The next track portion 106b, continuing from the portion 106a, curves in the opposite sense in an arc which extends toward the door first inwardly and then outwardly to the outer end of the track. The track has the general shape of the letter S. As the door is first unseated by bodily inward movement effected by actuator 3 it follows an arc of swing about hinge pin 50, and tends to swing clockwise relative to hinge arm 5 as viewed from above. This latter tendency is not prevented by the parallelogram linkage and track 106 but is controlled by it, so that the door's rate of cocking movement is governed by advance of the slider pin 104 along track section 106a as a function of bodily inward movement of the door from its seat. When the slider pin reaches the second section of track 106b the door is cocked as shown by broken lines in FIGURE 11, and the door's final opening movement may be commenced, wherein the operator pushes it generally edgewise out through the doorway along an arc of swing defined by the hinge arm. During this movement there is no danger of the operator losing control of the door due to wind forces or the like because the track section 106b establishes a substantially constant angular relationship between the door and hinge arms.

When the door reaches its final open position (FIGURE 12) it is latched in place by means comprising a pin 110 adapted to enter a hole 112 in the end of the channel in one of the track elements 106, under the extension force of a spring 114. A release finger 116 pivoted on lnk 110 at 118 is pinned to latch pin 110 at 120 in order to enable the operator to disengage the latch pin from the keeper hole 112 when the door is to be closed.

Closing movement of the door is executed in the reverse sequence of movements of the associated mechanism. The remaining snubber link 52 performs its previously described functions as in the embodiment of FIGURES 1 to 10, inclusive.

Because of the interconnection, hence the interdependence, of door position and tab position, there is no possibility of the tabs being extended nor of the bolts being extended while the door is still open or partly open. Thus the possibility of damage to these elements or complemental parts of the doorway structure by attempted closing of the door with the parts prematurely extended is completely avoided.

We claim as our invention:

1. In combination, a wall structure having an opening therein, a closure panel, said opening and closure panel having complementally formed edges adapted for seating of said panel against said wall structure to plug said opening from one side of said wall, and supporting and guiding means disposed along one edge of said closure panel and interconnecting said closure panel and said wall structure along the adjacent edge of the opening, said supporting and guiding means comprising an elongated member pivotally connected by one end to the closure panel and pivotally connected by its opposite end to the wall structure, the length of such elongated member and the relative locations of its pivotal connections providing clearance for hinged movement of the closure panel sequentially inwardly to unseat it from said wall structure opening, and thereupon angularly in relation to said elongated member to address it edge opposite said one edge outwardly through the opening, followed by outward bodily movement through said opening with said latter edge leading, into a fiinal position adjacent to said opening, said closure panel having a dimension parallel to the first-mentioned edge thereof which is at least slightly less than the corresponding dimension of the opening to permit such edgewise movement of the closure panel through said opening, and having a dimension generally perpendicular to said first-mentioned edge which is materially in excess of the corresponding dimension of said opening to permit said closure panel to seat against the first-mentioned side of the wall structure, said supporting and guiding means further comprising a second elongated member pivotally connected at one end to the closure panel at a location offset, in the thickness direction of the closure panel, from the closure panel pivotal connection of the first elongated member, a link pivotally connected at its opposite ends repectively to the first and second elongated members with the second such member disposed substantially parallel to the first, thereby forming, in conjunction with the portion of closure panel between the elongated members' pivots thereon, a parallelogram linkage, said second elongated member having a portion projecting endwise beyond its connection to said link, and control means operable to control the relative angular positioning of the closure panel, accompanying said sequential movements, said control means comprising a guide track mounted on the wall structure and a slider engaged in said guide track, said slider being carried by the projecting portion of the second elongated member, and said guide track having a curved initial portion producing the initial swinging of the closure panel angularly in relation to the first elongated member, and an oppositely curved final portion extending from one end of its initial portion to produce limited swinging of said closure panel relative to said first elongated member in the opposite sense through a relatively small angle during subsequent closure panel opening movement to its final position adjacent to the opening.

2. The combination defined in claim 1, and latch means including an element fixed to the guide track and an element fixed to the slider, interengageable in the final position of the closure panel to hold the same in such position, and means manually operable to release such latch elements, to permit closing of the closure panel.

3. In combination, a wall structure having an opening therein, a closure panel, said opening and closure panel having complementally formed edges adapted for seating of said panel against said wall structure to plug said opening from one side of said wall, and supporting and guiding means disposed along one edge of said closure panel and interconnecting said closure panel and said wall structure along the adjacent edge of the opening, said supporting and guiding means comprising vertically spaced elongated hinge arms, each pivotally connected by one end to the closure panel and pivotally connected by its opposite end to the wall structure substantially at said one edge of the opening, the length of such hinge arm and the relative locations of its pivotal connections providing clearance for hinged movement of the closure panel sequentially inwardly to unseat it from said wall structure opening, and thereupon angularly in relation to said hinge arm to address its edge opposite said one edge outwardly through the opening, followed by outward edgewise bodily movement through said opening with said latter edge leading, into a final position adjacent to said opening, said closure panel having a dimension parallel to the first-mentioned edge thereof which is at least slightly less than the corresponding dimension of the opening to permit such edgewise movement of the closure panel through said opening, and having a dimension generally perpendicular to said first-mentioned edge which is materially in excess of the corresponding dimension of said opening to permit said closure panel to seat against the first-mentioned side of the wall structure, said supporting and guiding means further comprising an elongated guide link pivotally connected by one end to the closure panel at a location offset from the pivotal connection of the latter to one of the vertically spaced hinge arms, a control link pivotally connected by one end to said hinge arm in the vicinity of the latter's pivotal connection to the wall structure and by its opposite end pivotally connected to the guide link near the latter's end opposite the closure panel, with the guide link disposed generally parallel to the hinge arm, a curvilinear guide track fixed to the wall structure substantially at said one edge thereof, and a guided element engaging and movable lengthwise in translation along said guide track, said guided element comprising a translational pivotal connection of said guide link to the guide track at a relative location on the guide link which is offset from both of its first-mentioned pivotal connections, thereby to control relative angular positioning of the closure member relative to the hinge arm accompanying swinging of the latter on its wall structure pivotal connection.

4. The combination defined in claim 3, wherein the pivotal connection of the control link to the guide link is located on the latter intermediate its respective connections to the closure panel and to the guide track.

5. The combination defined in claim 4, wherein the guide track is of generally S-shaped curvilinear configuration.

6. The combination defined in claim 3, and an elongated snubber link of variable length having relatively movable fluid-damped elements and spring means tending to maintain said elements relatively in a neutral position while permitting relative movement of the elements together and apart for spring-resisted contraction and extension of the snubber link, one end of said snubber link being connected to the closure member at a relative location offset from the connection of the other vertically spaced hinge arm thereto, a short link pivotally connected by one end to the wall structure at said one edge of the latter and pivotally connected by its opposite end to the opposite end of said snubber link, to be swung one way by generally endwise movement of said snubber link during closure member opening movement, and to be swung oppositely by such snubber link during closure member closing movement, and opposing stops respectively limiting swinging of said short link in advance of completion of such opening and closing movements of the closure member.

7. In combination, a wall structure having an opening therein, a closure panel, said opening and closure panel having complementally formed edges adapted for seating of said panel against said wall structure to plug said opening from one side of said wall, and supporting and guiding means disposed along one edge of said closure panel and interconnecting said closure panel and said wall structure along the adjacent edge of the opening, said supporting and guiding means comprising vertically spaced elongated hinge arms each pivotally connected by one end to the closure panel and pivotally connected by its opposite end to the wall structure substantially at said one edge of the opening, the length of such hinge arm and the relative locations of its pivotal connections providing clearance for hinged movement of the closure panel sequentially inwardly to unseat it from said wall structure opening, and thereupon angularly in relation to said hinge arm to address its edge opposite said one edge outwardly through the opening, followed by outward edgewise bodily movement through said opening with said latter edge leading, into a final position adjacent to said opening, said closure panel having a dimension parallel to the first-mentioned edge thereof which is at least slightly less than the corresponding dimension of the opening to permit such edgewise movement of the closure panel through said opening, and having a dimension generally perpendicular to said first-mentioned edge which is materially in excess of the corresponding dimension of said opening to permit said closure panel to seat against the first-mentioned side of the wall structure, said supporting and guiding means further comprising an elongated guide link pivotally connected by one end to the closure panel at a location offset from the pivotal connection of the latter to one of the vertically spaced hinge arms, control means connected to said guide link and operable to control relative angular positioning of the closure member relative to said hinge arm accompanying swinging of the latter on its wall structure pivotal connection, an elongated snubber link of variable length having relatively movable fluid-damped elements and spring means tending to maintain said elements relatively in a neutral position while permitting relative movement of the elements together and apart for spring-resisted contraction and extension of the snubber link, one end of said snubber link being connected to the closure member at a relative location offset from the connection of the other vertically spaced hinge arm thereto, a short link pivotally connected by one end to the wall structure at said one edge of the latter and pivotally connected by its opposite end to the opposite end of said snubber link, to be swung one way by generally endwise movement of said snubber link during closure member opening movement, and to be swung oppositely by such snubber link during closure member closing movement, and opposing stops respectively limiting swinging of said short link in advance of completion of such opening and closing movements of the closure member.

References Cited in the file of this patent

UNITED STATES PATENTS

| | | |
|---|---|---|
| 2,104,172 | Sibley | Jan. 4, 1938 |
| 2,228,711 | Steuber | Jan. 14, 1941 |
| 2,707,798 | Comey et al. | May 10, 1955 |
| 2,751,636 | Heinemann et al. | Jan. 26, 1956 |

UNITED STATES PATENT OFFICE
CERTIFICATE OF CORRECTION

Patent No. 3,051,280                               August 28, 1962

Burton Bergman et al.

It is hereby certified that error appears in the above numbered patent requiring correction and that the said Letters Patent should read as corrected below.

Column 6, line 60, for "it" read -- its --; line 62, after "outward" insert -- edgewise --.

Signed and sealed this 15th day of January 1963.

(SEAL)
Attest:

ERNEST W. SWIDER
Attesting Officer

DAVID L. LADD
Commissioner of Patents